(12) United States Patent
Barland

(10) Patent No.: US 9,046,143 B2
(45) Date of Patent: Jun. 2, 2015

(54) CALIPER COVER

(76) Inventor: Michael T. Barland, Chula Vista, CA (US)

( * ) Notice: Subject to any disclaimer, the term of this patent is extended or adjusted under 35 U.S.C. 154(b) by 284 days.

(21) Appl. No.: 12/492,130

(22) Filed: Jun. 25, 2009

(65) Prior Publication Data

US 2009/0321198 A1    Dec. 31, 2009

Related U.S. Application Data

(60) Provisional application No. 61/075,715, filed on Jun. 25, 2008.

(51) Int. Cl.
| | | |
|---|---|---|
| F16D 65/00 | (2006.01) | |
| F16D 65/78 | (2006.01) | |
| F16D 65/84 | (2006.01) | |
| F16D 65/12 | (2006.01) | |
| F16D 55/00 | (2006.01) | |

(52) U.S. Cl.
CPC ............ F16D 65/0031 (2013.01); *F16D 65/84* (2013.01); *F16D 65/128* (2013.01); *F16D 2055/0037* (2013.01)

(58) Field of Classification Search
CPC ... F16D 65/00; F16D 65/0081; F16D 65/128; F16D 2065/13; F16D 2065/1304; F16D 2065/134; F16D 65/78; F16D 65/84; F16D 2300/021; F16D 2300/0212; F16D 65/0031; F16D 2055/0037
USPC ............ 188/73.1, 73.31, 73.32, 73.36, 73.37, 188/73.38, 206 R, 218 A
See application file for complete search history.

(56) References Cited

U.S. PATENT DOCUMENTS

| 2,527,072 | A | * | 10/1950 | Pogue ......................... 188/73.31 |
| 3,605,956 | A | * | 9/1971 | Hahm et al. ................. 188/72.3 |
| 5,538,105 | A | * | 7/1996 | Rike ........................... 188/73.32 |
| 5,549,181 | A | * | 8/1996 | Evans .......................... 188/72.3 |
| 5,601,171 | A | * | 2/1997 | Flotow ........................ 192/70.13 |
| 2004/0016610 | A1 | * | 1/2004 | Morris ........................ 188/73.31 |
| 2005/0284710 | A1 | * | 12/2005 | Roberts et al. .............. 188/73.1 |
| 2008/0067016 | A1 | * | 3/2008 | Pritz et al. .................. 188/73.38 |
| 2008/0110707 | A1 | * | 5/2008 | Kromer ....................... 188/218 A |

* cited by examiner

*Primary Examiner* — Melody Burch
(74) *Attorney, Agent, or Firm* — Donn K. Harms

(57) ABSTRACT

A caliper cover for brake calipers which is easily engageable using a clip having a slot to engage a bolt extending from a member engaged to the caliper cover.

5 Claims, 3 Drawing Sheets

CALIPER COVER

This application claims priority to U.S. Provisional Patent Application No. 61/075,715 filed Jun. 24, 2008, and incorporated herein in its entirety by reference.

FIELD OF THE INVENTION

The disclosed device concerns brake calipers employed on vehicles such as cars and trucks. More particularly, it relates to a caliper cover device and mounting system adapted to mechanically engage a decorative and/or functional cover, in a position covering the caliper on the wheel side of the caliper.

BACKGROUND OF THE INVENTION

Brake calipers have been employed on modern vehicle brake systems as an upgrade from older style drum brakes. Such calipers conventionally engage at the perimeter of a rotor engaged to the axle of the wheel they are intended to brake. In operation, when a brake pedal is pressed, two opposing brake pads are forced together toward the rotating rotor and engage and slow it and the wheel.

There are a number of problems associated with such systems from an owner's standpoint. First, calipers inherently eject brake shoe dust onto the wheel and caliper itself. The dust is the byproduct of the frictional engagement of the brake pads with the rotor during stopping of the wheel. Most drivers consider the brake dust unsightly on the caliper as well as being less than fond of the caliper view through the wheel slots.

Another problem encountered by such calipers is that of heat from the frictional engagement to the rotor, as well as the communication of the dust not only to the caliper but to the wheels and surface of the car and surrounding wheel well. Previous caliper covers have been employed however, they glue to the caliper which is unsafe and hard to remove, or, require the removal of the caliper from its mount and the employment of special tools and mounting components to provide a mount for the caliper cover. This is beyond the scope of most owner's skills and tool collections.

As such, there exists an unmet need for a caliper cover that does not require removal of the caliper from the axle to engage the cover. Such a device should easily engage to the caliper without special tools in a simple and quick fashion and should provide aesthetic enhancement of the view of the caliper through the slots of the wheel it stops. Additionally, such a device should provide a means to contain brake dust to keep it from covering the wheel too quickly and optionally may be adapted to provide cooling to the caliper using air venting past the cover on a moving vehicle.

SUMMARY OF THE INVENTION

The device as herein disclosed and described provides for the aforementioned need by the employment of a simple mounting system. The mounting system employs a caliper mounting clip that will engage with the caliper without any special tools. So engaged the clip provides an engagement for a cover member on one end of the member. The other end of the cover member is engaged to the caliper cover and can be permanently engaged or temporarily engaged should the user wish to change the covers and the aesthetic quality they provide.

Optionally, the covers can be vented with slots to intake moving air provided by the moving vehicle, and direct an airflow toward the caliper behind the cover. This action will not only cool the caliper, but will have the added effect of directing brake dust away from the wheel and toward the road surface thereby providing a means to minimize brake dust accumulation on the caliper, wheel, and vehicle.

The clip is adapted in width to fit between the opposing brake pads and has a substantially "u" shape at angles of engagement to adapt the clip to engage the intended caliper shape. So engaged, the clip is adapted on a surface lying on top of the caliper to engage the distal end of the cover member that allows for engagement of the cover to the caliper.

The cover member is curved to block the view of the caliper when viewed through the slots of the wheel of the axle the caliper engages. The curved surface will direct incoming air through the gap between the cover and caliper and tend to vent brake dust rearward out the back of the gap. Optional slots may be included that have flanges adapted to catch airflow passing the side surface of the cover and direct it toward the caliper of a moving vehicle. This focusing of airflow will cool the caliper of the moving vehicle and aid in keeping the caliper cool and brake fluid operating the caliper from boiling.

It is thus an object of this invention to provide a decorative caliper cover when viewed through the slots of a wheel hub to which the caliper is engaged.

It is a further object of this invention to provide such a caliper cover that employs a simple mounting system allowing user installation with minimal tools and time and without removing the caliper from its mount.

It is a further object of this invention to provide such a caliper cover which optionally is adapted to cool the caliper with airflow and will also provide means to minimize accumulation of brake dust from the caliper on the adjacent wheel.

With respect to the above description and background, before explaining at least one preferred embodiment of the invention in detail, it is to be understood that the invention is not limited in its application to the details of construction and to the arrangement of the components and/or steps set forth in the following description or illustrated in the drawings. The various apparatus and methods of the invention herein described and disclosed are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing other devices, methods and systems for carrying out the several purposes of the present disclosed device for providing an easily mounted and highly utilitarian caliper cover. It is important, therefore, that the objects and claims be regarded as including such equivalent construction and methodology, insofar as they do not depart from the spirit and scope of the present invention.

DETAILED DESCRIPTION OF PREFERRED EMBODIMENTS

Figure 1:
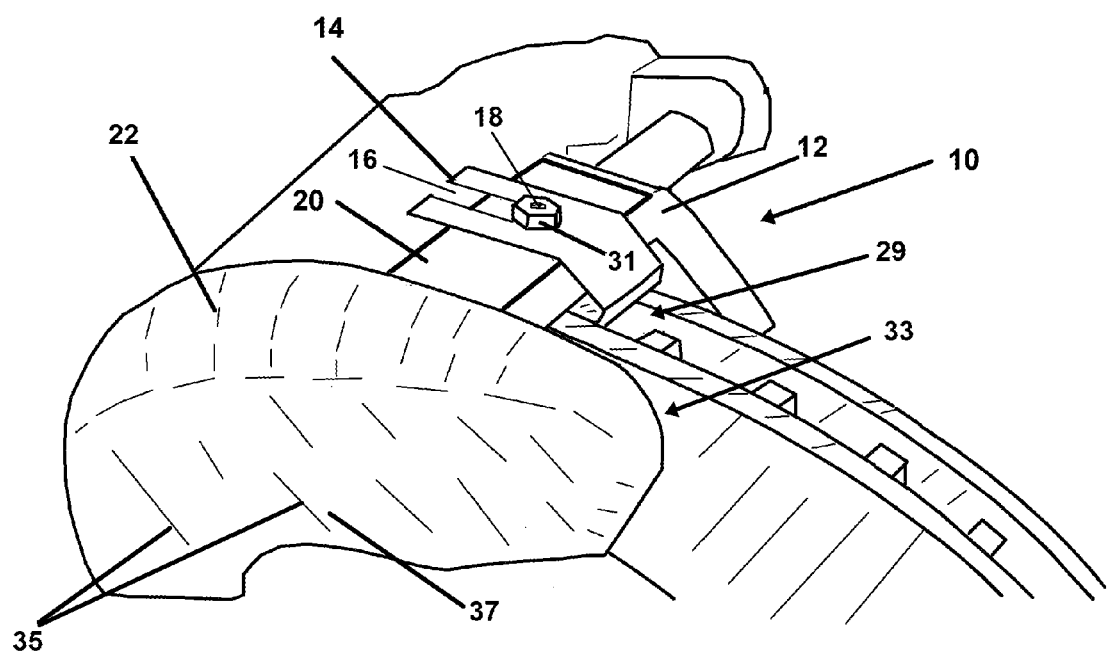
FIG. 1 depicts a perspective view of the caliper device in an engaged position on a conventional brake caliper with the clip overlapping the clip member extending from the caliper and the nut torqued to hold the device mounted.
Figure 2:
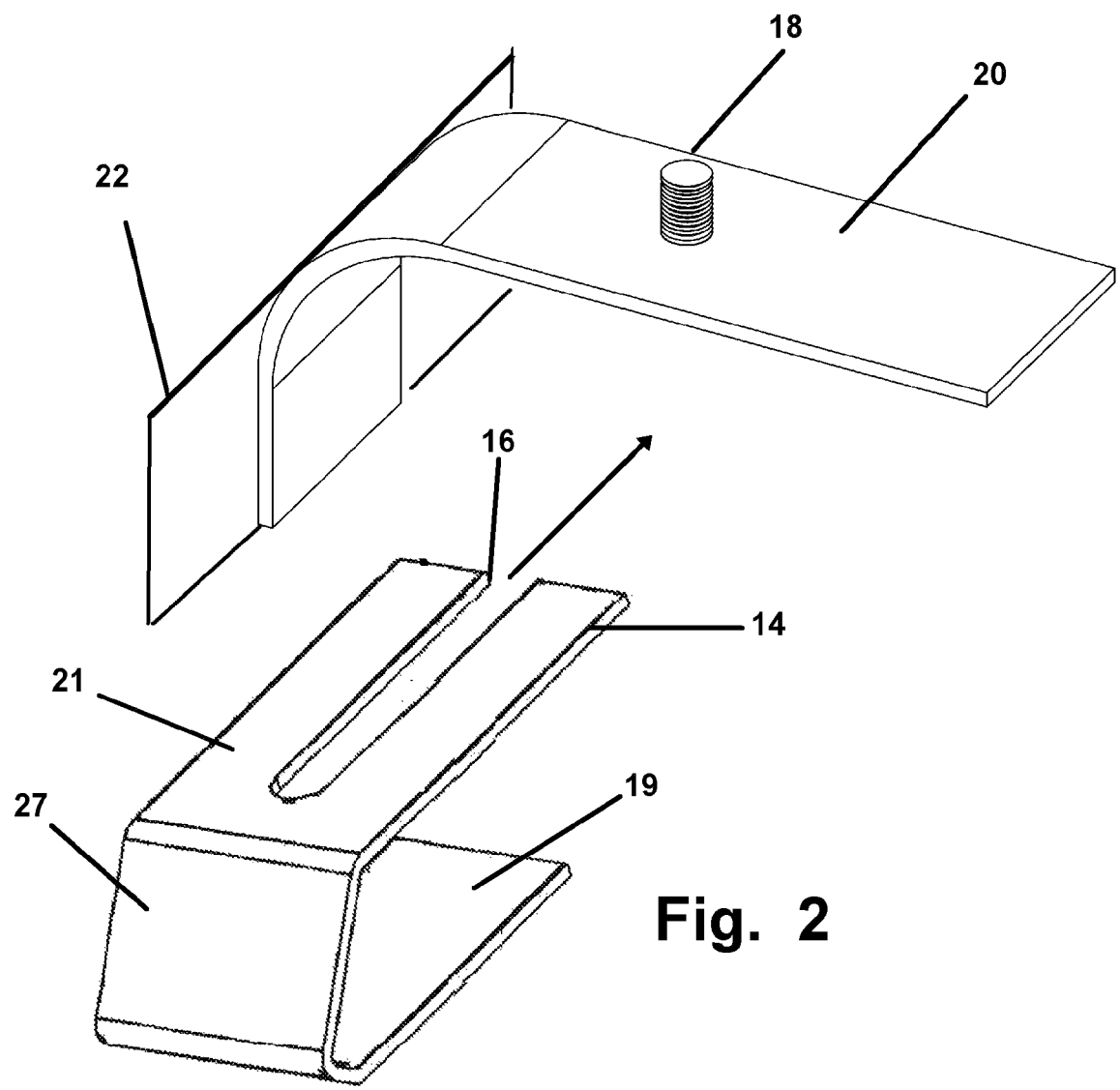
FIG. 2 depicts the cover member extending from its engagement to the caliper cover and the slotted clip which engages over the bolt extending above the cover member.
Figure 3:
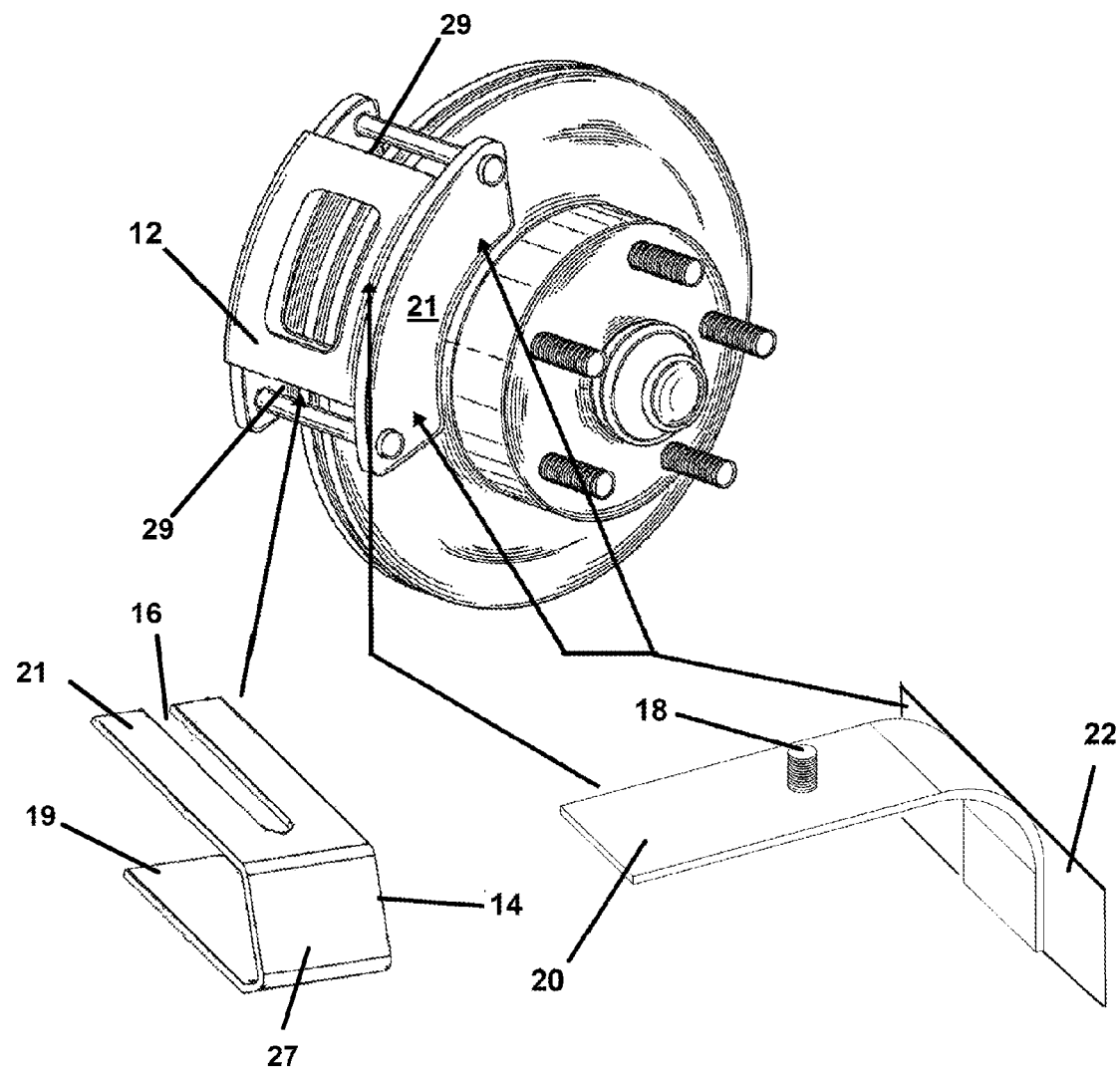
FIG. 3 depicts the mounting positions of the components herein upon the brake caliper wherein the clip engages one side of the caliper and the member perpendicular to the clip.

Referring now to the drawings in FIGS. 1-3, wherein similar parts are identified by like reference numerals, the device 10 is shown in FIG. 1 in the engaged position on a conventional brake caliper 12. The device 10 employing the components herein is adapted for easy engagement to a brake caliper 12 using simple tools and without the need to dismount the caliper 12 as with prior art, or to remove fasteners holding the caliper 12 to the axle or hub of the wheel it stops.

As shown in FIGS. 1-3, a clip 14 which is as noted substantially U-shaped, has a slot 16 adapted to engage around a projecting bolt 18 on the caliper member 20 or cover member, which supports the caliper cover 20 over the side surface 29 of a caliper 12. The clip 14 as shown in the figures has an angled arrangement between opposing side projections 19 and 21 and a connecting base portion 27. The angles are adapted for the caliper the clip 14 is adapted to engage and can vary.

In use the shorter projection 19 engages through a gap or side slot 29 which exists in almost all conventional calipers 12 and fits in-between the two opposing brake pads. The distance between the two projections 19 and 21 is adapted to cause the clip 14 to engage the caliper body 31 tightly in the engaged position of FIG. 1.

Once so engaged, the bolt 18 on the caliper member 20 may be slid into the slot 16. Once so positioned a nut 31 is engaged to the bolt 18 and holds the two components together and positions the caliper cover 22 adjacent to the side surface 29 of the caliper 12. A gap 33 between the caliper cover 22 and the caliper 12 creates an airflow to direct brake dust rearward. Slots 35 may be cut into the cover and projecting flanges 37 formed on the outside surface of the caliper cover 22 to catch moving air and direct it toward the caliper 12 to cool it. Alternatively, the caliper cover 22 may be made of aluminum with fins and abutted in contact with the caliper 12, It will then function as a heat sink.

It is to be understood that elements of different construction and configuration and different steps and process procedures and other arrangements thereof, other than those illustrated and described, may be employed for providing the easily mounted decorative and functional caliper covers herein. As such, while the present invention has been described herein with reference to particular embodiments thereof, a latitude of modifications, various changes and substitutions are intended in the foregoing disclosure, and it will be appreciated that in some instance some features of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. A caliper cover configured with engagement with a brake caliper, comprising:
   a clip, said clip having substantially a U-shape defined by upper and lower projecting clip members extending from opposite ends of a connecting base portion;
   said U-shaped clip is installed above a brake rotor, said brake rotor being generally planar and circular-shaped when viewed from a side, said brake rotor having a thickness perpendicular to the plane of the circular she of the rotor, said U-shaped clip is also installed between shoes of said brake caliper, wherein said U-shaped clip is also located within said thickness of the brake rotor;
   said circular-shaped rotor including a center portion, said U-shaped clip having a width, said width adapted to fit within said center portion of said circular-shaped rotor;
   said upper clip member has a slot therein extending to an edge;
   a cover, said cover having a generally planar interior surface and having a cover member, said cover member extending away from said interior surface;
   a mounting member projecting from said cover member, said mounting member sized to slide into said slot on said upper clip member to an engaged position therein;
   said mounting member in said engaged position with said slot is projecting above a top surface of said upper clip member when said clip is in said engaged position with said caliper; and
   a fastener for engaging said mounting member and biasing said cover member against said upper clip member while said clip is in said engaged position, whereby said cover is engaged to said cover member and is positioned to a side surface of said caliper.

2. A caliper cover configured with engagement with a brake caliper, comprising:
   a clip, said clip having substantially a U-shape defined by an upper clip member and a lower clip member extending from opposite ends of a connecting base portion;
   said U-shaped clip is installed above a brake rotor, said brake rotor being generally planar and circular-shaped, said brake rotor having a thickness perpendicular to the plane of the circular shape of the rotor,
   said upper clip member having a slot extending along a length of said super clip member;
   a cover, said cover having a generally planar interior surface and having a cover member, said cover member extending away from said interior surface;
   said cover and said cover member each having a length each defining a longest dimension of said cover and cover member, said length of said cover and said cover member being oriented substantially perpendicular from each other;
   a mounting member protecting from said cover member, said mounting member is sized to slide into said slot on said upper clip member to an engaged position therein;
   said mounting member in said engaged position with said slot projects above a top surface of said upper clip member when said clip is in said engaged position with said caliper; and
   a fastener for engaging said mounting member and biasing said cover member against said upper clip member of said clip while said clip is in said engaged position, whereby said cover is engaged to said cover member and is positioned to a side surface of said caliper.

3. The caliper cover configured for engagement with the brake caliper of claim 2, wherein the cover member has a thickness, wherein the length of the cover is substantially greater than the thickness of the cover member.

4. The caliper cover configured with engagement with the brake caliper of claim 2, wherein both the upper clip member and the lower clip member form an obtuse angle where they meet the connecting base portion when viewed from a side of the clip.

5. The caliper cover configured with engagement with the brake caliper of claim 2, wherein the fastener for engaging the mounting member is a nut.

* * * * *